I. W. NORTON.
POST-DRIVER.
No. 173,048. Patented Feb. 1, 1876.
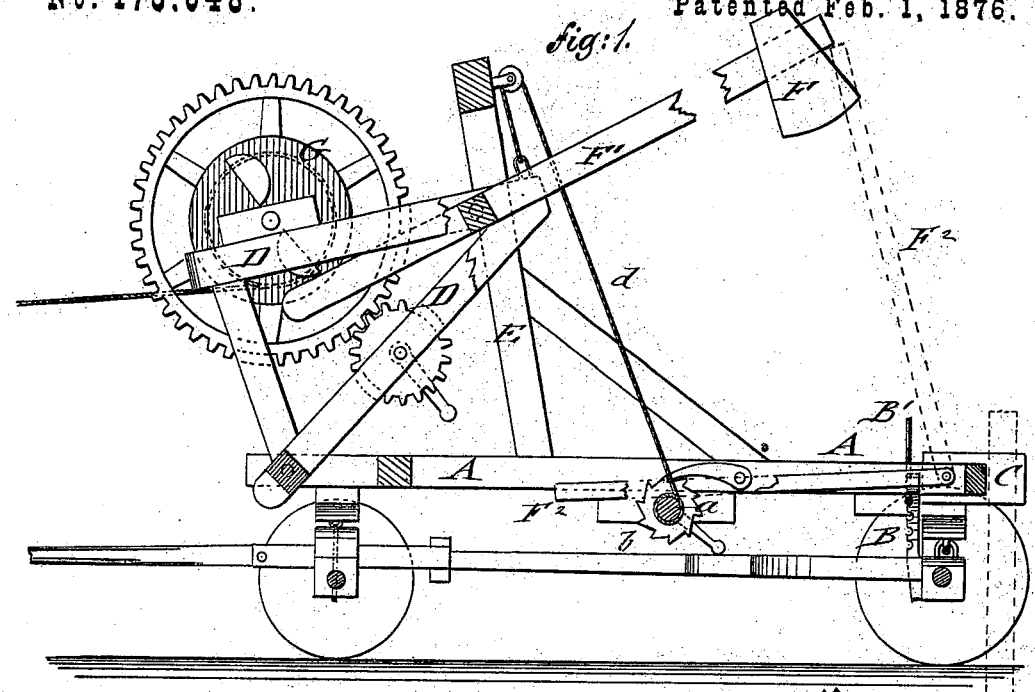
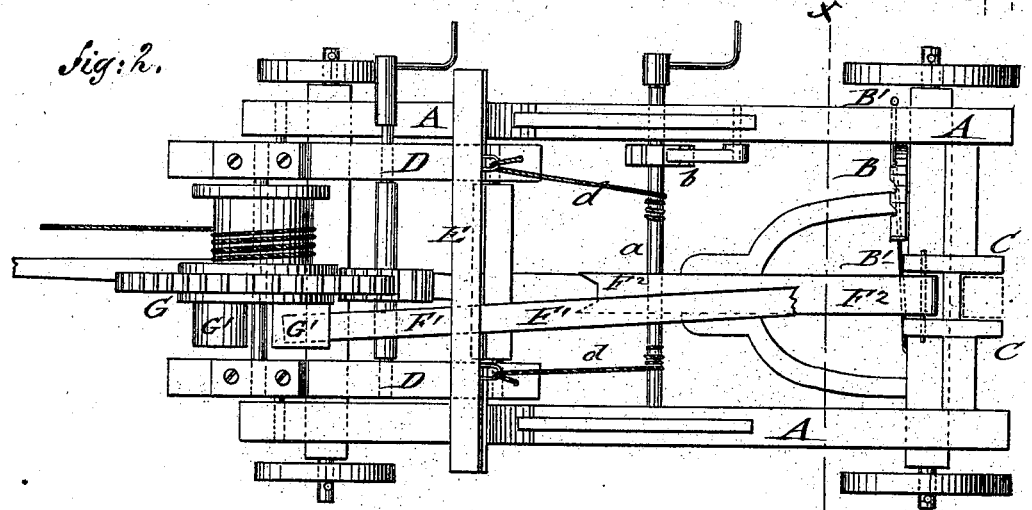
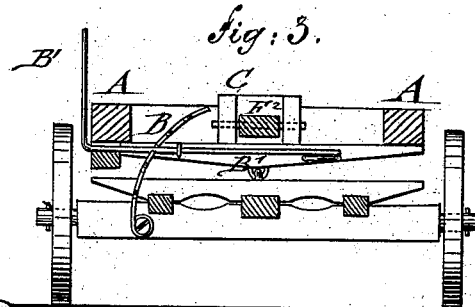
WITNESSES:
Chas. Nida
Alex F. Roberts
INVENTOR:
Isaiah W. Norton
BY
ATTORNEYS.

UNITED STATES PATENT OFFICE.

ISAIAH W. NORTON, OF MEMPHIS, MISSOURI.

IMPROVEMENT IN POST-DRIVERS.

Specification forming part of Letters Patent No. 173,048, dated February 1, 1876; application filed December 11, 1875.

*To all whom it may concern:*

Be it known that I, ISAIAH W. NORTON, of Memphis, in the county of Scotland and State of Missouri, have invented a new and Improved Post-Driver, of which the following is a specification:

In the accompanying drawing, Figure 1 represents a vertical longitudinal section of my improved post-driver; Fig. 2, a plan view; and Fig. 3, a vertical transverse section of the same on the line $x\ x$, Fig. 2.

Similar letters of reference indicate corresponding parts.

My invention relates to an improved portable post-driver, that may be used on sloping ground for the purpose of driving in the posts in perpendicular position with great rapidity.

The invention will first be described in connection with drawing, and then pointed out in the claims.

In the drawing, A represents the supporting bed-frame of my post-driver, which frame is placed on wheels and pivoted by its bolsters to the lateral axle-pieces.

The bed-frame is adjusted to different inclinations, to conform to the sloping of the ground into which the fence-posts have to be driven, by a notched band or guide, B, of arc shape, into which a spring-lever, B', locks, according to the position to which the bed-piece is required to be set. The object of the adjustability of the swinging bed-frame is to drive the posts perpendicularly into the ground at different slopes of the same.

At the rear part of bed-frame A are guide-pieces C, which hold the posts in position for the action of the hammer.

The hammer-supporting frame D is pivoted to the front part of the bed-frame A, and adjusted to greater or lesser height, according to the height of the posts to be driven, by means of a winding-roller, $a$, with ratchet and pawl $b$, which is operated by a hand-crank to wind up the cords $d$ that pass through pulleys of a fixed upright frame, E, to the ends of the pivoted frame D. The fixed frame E is made of side posts or standards, which are braced to the bed-frame and connected by a lateral piece at the top.

A hammer, F, of suitable size and weight, and rounded-off face, is attached to the end of a lever, $F^1$, which is fulcrumed to frame D, and actuated by a revolving wheel, G, with cam eccentrics, G', that engage the rear end of the hammer-lever.

The actuating-wheel G may be operated by means of a hand-crank, pinion, and gear-wheel, if desired, so as to raise and drop the hammer whenever one of the cams comes in contact with the lever, or the wheel G may be operated by horse-power, attached to a rope that passes over suitable pulleys from a point of the bed-frame near the post-guides to and around a drum of the actuating-wheel, so that the forward motion of the horses unwinds the rope from the drum and gives a series of blows sufficient to drive the post. The cord is wound up again by the crank, pinion, and gear-wheel, when the horses return toward the driver to get ready to drive the next post. One or more eccentrics or cams may be used on the actuating-wheel G, according to the size of the same and the rapidity of strokes desired.

The post-driver is moved from place to place in the line of the fence, and the hammer supported on a rest-piece, $F^2$, hinged to the post-guide pieces at the inside of the bed-frame.

The hammer is raised by bringing one of the cams on the end of its lever, and the post is then placed into position in the guides. The hammer is then adjusted to the height of the same by raising or lowering its pivoted supporting-frame. When the hammer is in the required position, the gear or drum is operated and the cams of the actuating-wheel will engage the hammer-lever, producing powerful strokes of the hammer in rapid succession, until the post is driven into a level with the height of the bed-frame.

Having thus described my invention, I claim as new and desire to secure by Letters Patent—

1. The combination, with the bed-frame, having upright supporting posts or frame, of a pivoted hammer-supporting frame, set to greater or lesser height, according to the height of the posts to be driven, by suspending-cords and mechanism, substantially as set forth.

2. The combination of pivoted supporting-frame D, fulcrumed hammer-lever $F^1$, and actuating-wheel G, having cams or eccentrics, G, with a suitable hand or power driving mechanism, to produce rapid blows of hammer, substantially as described.

ISAIAH W. NORTON.

Witnesses:
SANFORD HANSEN,
CHARLES W. McCANDLESS.